United States Patent [19]

Calleson

[11] 4,185,393

[45] Jan. 29, 1980

[54] DEVICE FOR MEASURING THE CIRCUMFERENCE OF A CYLINDRICAL ROD

[75] Inventor: Donald A. Calleson, Durham, N.C.

[73] Assignee: Liggett Group Inc.

[21] Appl. No.: 945,759

[22] Filed: Sep. 25, 1978

[51] Int. Cl.² .......................... G01B 5/00; G01B 5/08
[52] U.S. Cl. ................................................. 33/178 R
[58] Field of Search ............. 33/125 R, 141 R, 174 R, 33/178 R

[56] References Cited

U.S. PATENT DOCUMENTS 2,971,262  2/1961  Muller .............................. 33/178 R

FOREIGN PATENT DOCUMENTS 1106971  5/1961  Fed. Rep. of Germany ........ 33/178 R Primary Examiner—Richard R. Stearns
Attorney, Agent, or Firm—J. Bowen Ross, Jr.

[57] ABSTRACT pg,1 The hand held measuring device measures the circumference of a cylindrical rod by moving the rod through a measured path between two cylinders. An ink marking device is used to place an index mark on the rolling rod and a transparent scale is used at the end of the measured surface of the outer cylinder to indicate the distance the rod has travelled. Coincidence of the index mark with the scale reading is a measure of the circumference of the rod. The device is operated manually via a hand wheel secured to a trunnion of the inner cylinder.

13 Claims, 7 Drawing Figures

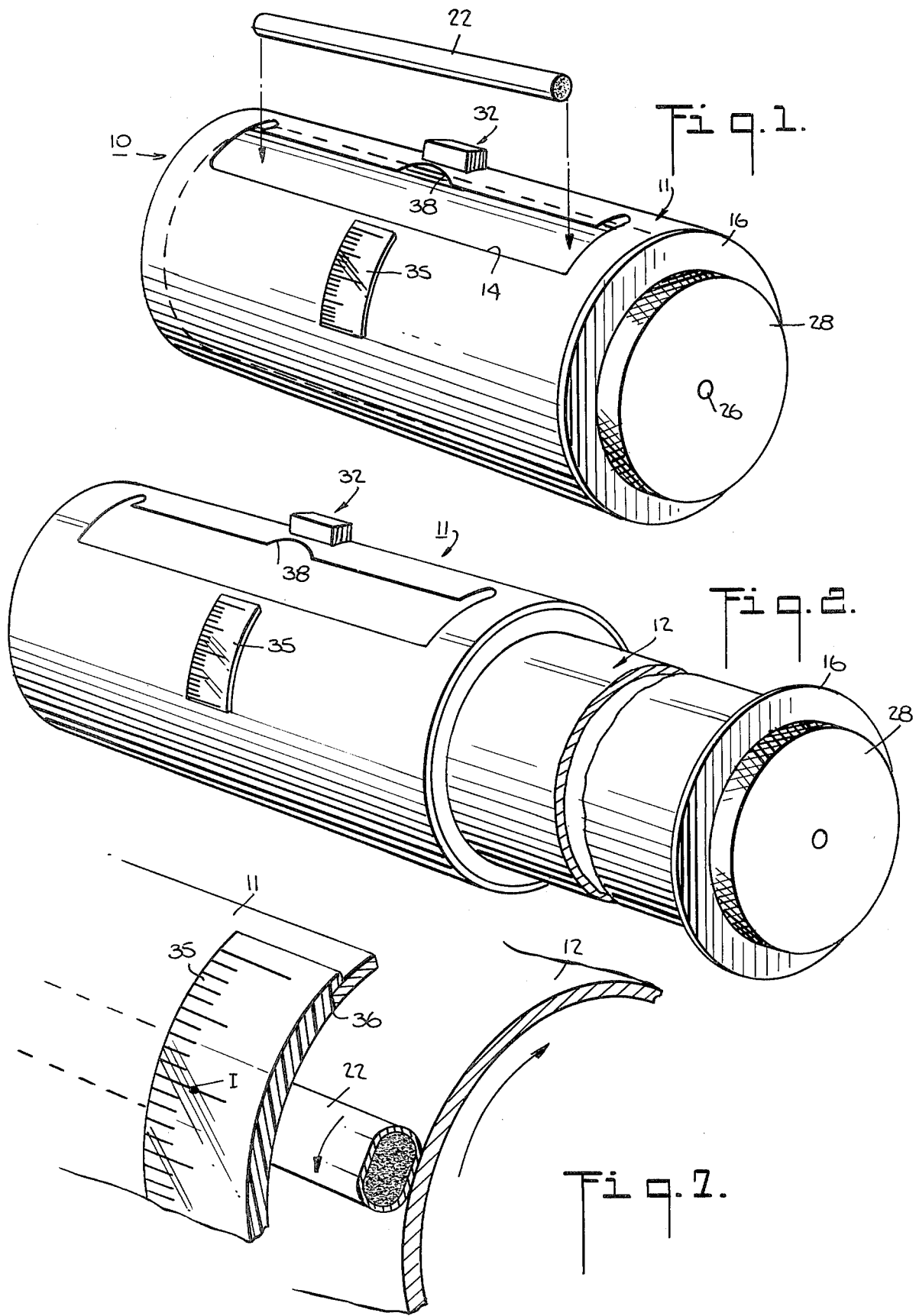

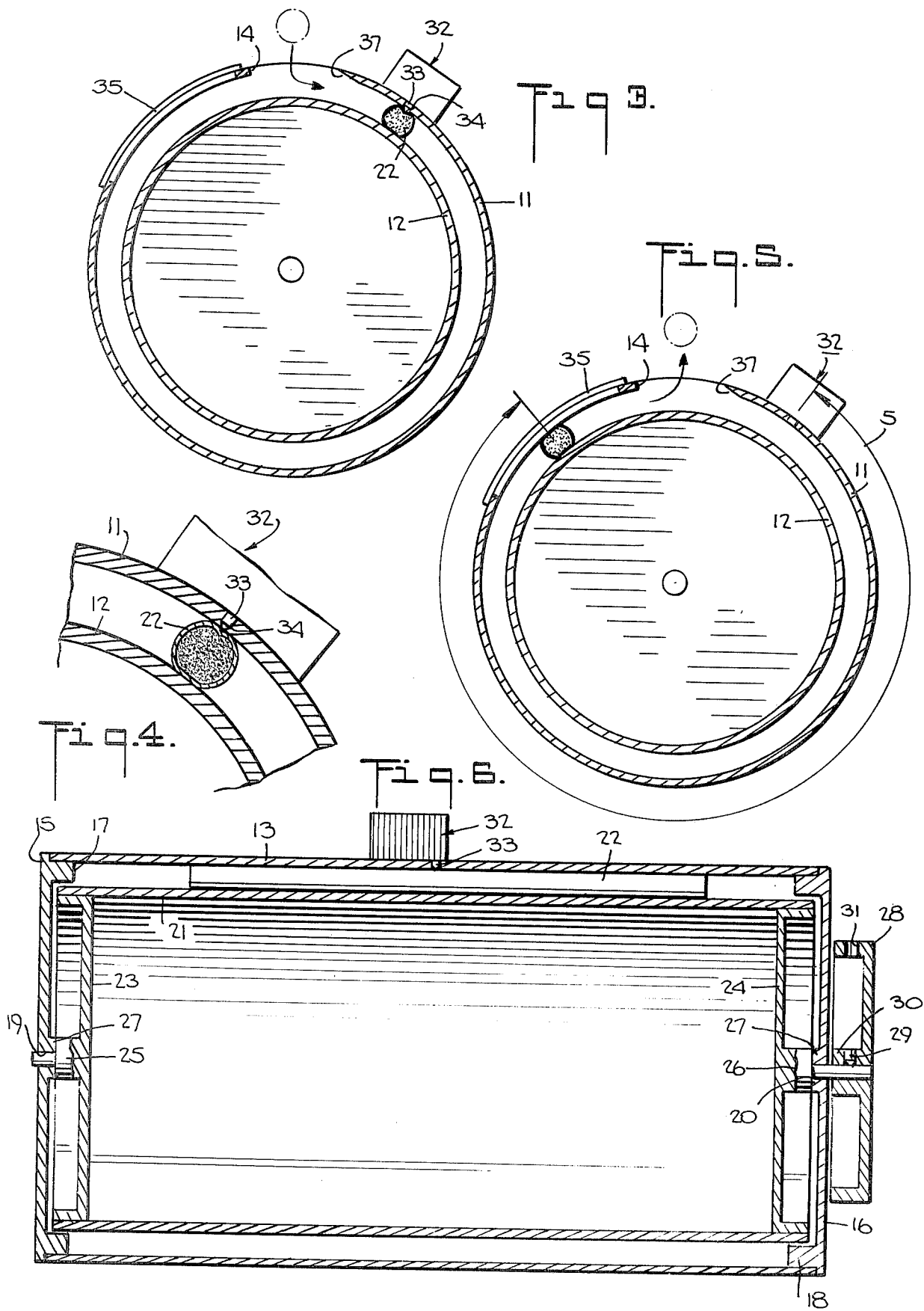

DEVICE FOR MEASURING THE CIRCUMFERENCE OF A CYLINDRICAL ROD

This invention relates to a device for measuring the circumference of a cylindrical rod and, particularly, a filter rod.

Heretofore, there has been a need for a simple but accurate means for measuring the circumference of rods such as filter rods and finished cigarettes. Generally, the devices which have been used have not been satisfactory for various reasons. For example, in some cases, the rods are not round. In other cases, where use is made of air gauges, the use of highly porous wrappers on filter rods affect the readings of the gauge. Also, in the case of optical-type instruments, a fuzzy surface on a porous wrapper can affect the readings on these instruments.

Other instruments such as precision electronic measuring devices have also been known which utilize a circumferential tape to measure the circumference of a rod. While these have a potential for high accuracy, such is obtained at high cost. Also, they may deform soft rods and give false readings. The device described by this invention is not affected by rod softness. In fact operation appears to be enhanced by soft rods.

Accordingly, it is an object of this invention to provide an inexpensive device for measuring the circumference of a rod.

It is another object of the invention to provide a device for measuring a rod circumference which is simple to use and accurate.

Briefly, the invention provides a device for measuring the circumference of a cylinder rod which comprises a first means for rolling a rod through a known number of revolutions on a measured surface without slippage, a second means for placing an index mark on the rod at an initial point of the measured surface and a third means for measuring the position of the index mark on the measured surface after rolling of the rod on the surface.

The device operates on the very simple principle of measuring the circumference of a rod by rolling the rod a predetermined or known number of revolutions on a measured surface and measuring the distance the rod has rolled.

The means for rolling a rod is embodied by a pair of concentric cylinders which define an annular gap for the rolling of the rod therebetween. The outer cylinder is further provided with a longitudinally disposed slot in a peripheral wall to permit insertion of a rod into the gap.

The means for placing an index mark on the rod is constituted by a marking means mounted on the outer cylinder. This marking means includes an ink marker or pen which is disposed to place an ink index mark on the rod at the initial point of the measured surface as the rod rolls past the marker.

The means for measuring the position of the index mark is formed by a graduated scale which is disposed over an aperture in the peripheral wall of the outer cylinder. This scale is positioned to indicate a multiple of the circumference of a rod which is being measured.

For example, in order to measure the circumference of the filter rod which has a circumference of 24.5 millimeters to the nearest 0.1 millimeter, the filter rod is inserted between the two concentric cylinders and is rolled without slippage through ten revolutions starting from the ink marker. At the completion of the tenth revolution, the ink mark on the cigarette appears under the scale to give a measure of the distance the rod has rolled. For ten revolutions, the distance would be indicated as 245 millimeters. Since the third digit is in the units of millimeters and represents tenths of a millimeter circumference, the scale need only be graduated in millimeters to read a rod circumference to the nearest 0.1 millimeter.

The accuracy of the device thus depends only on the placement of a readable index mark on the rod, the rolling of the rod through a known number of revolutions on a measured surface with no slippage and the measurement of the position of the index mark on the measured surface after rolling of the rod. These are all accomplished easily and compactly by rolling of the rod between the surfaces of the two concentric cylinders.

Generally, the scale is graduated in millimeters starting at a distance, for example of 220 millimeters from the marker point. The scale is 30 millimeters long and is graduated in graduations of one millimeter per division. This allows the measurement of rods from 22 millimeters to 25 millimeters in circumference.

Generally, the spacing between the cylinders provides a gap of 7.0 millimeters. This causes a partial flattening of a filter rod of 24.5 millimeters diameter and thus assures good frictional contact and no slippage. The flattening is not critical and the 7.0 millimeter spacing works well for rods in the range of from 7.5 to 8 millimeters in diameter.

After ten revolutions of the rod, the index mark becomes visible through the aperture in the outer cylinder. The distance measured according to the scale is then divided by 10 to obtain the circumference of the rod.

An additional measuring resolution can be obtained by choosing a larger cylinder diameter such that 20 or 50 rod revolutions can be made. In these cases, the graduation of one millimeter on the scale would represent 0.05 millimeter and 0.02 millimeter circumference, respectively.

These and other objects and advantages of the invention will become more apparent from the following detail description taken in conjunction with the accompanying drawings wherein:

FIG. 1 illustrates a perspective view of a measuring device in accordance with the invention;

FIG. 2 illustrates a partially exploded view of the measuring device of FIG. 1;

FIG. 3 illustrates a cross-sectional view of the measuring device of FIG. 1;

FIG. 4 illustrates a detail of the marking means of the device in accordance with the invention;

FIG. 5 illustrates the position of a rod under the graduated scale of the measuring device of FIG. 1;

FIG. 6 illustrates a transverse cross-sectional view of the measuring device of FIG. 1; and FIG. 7 illustrates an enlarged detail of the graduated scale for measuring the diameter of a filter rod on the measuring device.

Referring to FIGS. 1, 2 and 3, the measuring device 10 is provided with a means for rolling the rod through a known number of revolutions on a measured surface without slippage. This means is constituted by a pair of concentric cylinders 11, 12.

The outer cylinder 11 has a peripheral wall 13, a longitudinally disposed slot 14 which extends across the peripheral wall 13, an integral end wall 15 at one end and a removable end wall 16 at the opposite end. As shown in FIG. 6, the integral wall 15 is fixedly secured in the peripheral wall 13 via an annular shoulder 17. For example, use may be made of a press fit engagement between the shoulder 17 and the peripheral wall 13. The removable wall 16 is of similar construction and has an annular shoulder 18 which is slidably mounted within the peripheral wall 13. Each wall 15, 16 also has a centrally located aperture 19, 20.

The inner cylinder 12 has a peripheral wall 21 which is spaced from a peripheral wall 13 of the outer cylinder 11 in order to define a gap for rollably receiving a filter rod 22 therebetween. In addition, the inner cylinder 19 has a pair of recessed end walls 23, 24 which are received within the peripheral wall 21. Each of these end walls 23, 24, carries a trunnion 25, 26, respectively which is rotatably journalled within the respective opening 19, 20 of the end walls 15, 16 of the outer cylinder 11.

In order to enhance the rotatability of the inner cylinder 12 relative to the outer cylinder 11, each of the end walls 15, 16 carries an annular shoulder 27 about the opening 19, 20 for abutting against a shoulder portion on the trunnions 25, 26.

Also, the annular shoulders 17, 18 of the end walls 15, 16 are sized with an inside diameter slightly larger than the outer diameter of the peripheral wall 21 of the inner cylinder 12.

The measuring device 10 also has a hand wheel 28 which is secured to the trunnion 26 of the inner cylinder 12 on a side opposite the end wall 16 of the outer cylinder 11. In this regard, the hand wheel 28 is recessed and is releasably secured to the trunnion 26 by means of a set screw 29. As shown, the set screw 29 passes through a collar 30 on the hand wheel 28 which passes about the trunnion 26. A suitable aperture 31 is provided in a peripheral wall of the hand wheel 28 in order to provide access by a suitable tool (not shown) to the set screw 29. The hand wheel 28 is slightly spaced from the end wall 16 to permit ready rotation of the inner cylinder 12 within the outer cylinder 11.

The measuring device 10 is also provided with a means for placing an index mark on a rod 22 at an initial point of the measured surface. As shown in FIGS. 3 and 4, this means is in the form of an ink marking element 32 which has an ink pen 33 passing through an opening 34 in the peripheral wall 13 of the outer cylinder 11 as well as an ink reservoir (not shown) for feeding ink to the pen 33. The pen 33 is provided with a relatively small point for placing an index mark or dot on a filter rod 22 which rolls past the pen 33.

The measuring device also has a means for measuring the position of the index mark on the measured surface after rolling on the measured surface. To this end, as shown in FIGS. 5 and 7, the measuring means is in the form of a graduated scale 35 which is positioned over an aperture 36 in the peripheral wall 13 of the outer cylinder 11. The aperture 36 is positioned on a side of the slot 14 which is opposite the marking means 32.

The scale 35 is transparent and is provided with one millimeter graduations. As shown in FIG. 5, the measured path 5 upon which a rod 22 rolls extends from the center line of the pen 33 to an intermediate point of the scale 35. The scale 35 extends over a portion of the terminal end of the scale so as to provide for a range of readings. For example, the scale 35 is graduated in millimeters starting at a distance of 220 millimeters from the pen 33 and extends to a distance of 250 millimeters from the pen 33.

As shown in FIG. 3, the outer cylinder 11 is provided with a chamfered edge 37 on the outlet side of the aperture 14. In addition, a semi-circular recess 38 can be formed on the outlet side of the slot 14 to permit clearance for the fingers of an operator.

In order to measure the diameter of a rod 22 such as a filter rod having a nominal circumference of 24.5 millimeters, the gap between the cylinders 11, 12 is 6.5 millimeters. This permits the rod to be partially flattened, thus, assuring good frictional contact and no slippage. The rod 22 is dropped into the slot 14 and the hand wheel 28 is then rotated to move the rod 22 along the measured path 5 towards the scale 35. As the rod moves under the pen 33 an index mark I is placed upon the outside of the rod 22. Since the rod generally has a porous outer wrap, the ink is readily received and a clear mark is made. Continued rotation of the cylinders 11, 12 brings the rod 22 under the transparent scale 35 with the index mark I appearing below one of the graduations on the scale (see FIG. 7). After ten revolutions of the rod 22, the index mark should indicate the correct circumference of the rod divided by 10. For example, if the index mark appears at the scale mark 245, the circumference is 24.5 millimeters. Should the index mark appear under the scale graduation 250, the circumference is 25.0 millimeters. If the rod is undersized, for example less than 24.0 millimeters, the rod may be discarded as being undersized.

The measuring device can be used to spot check the diameter of the filter rods being manufactured on rod making machines of high speed capacity. Should a spot check indicate that rods are being made of less than critical diameter, the rod making machine can be adjusted or shut down in order to make an adjustment so as to produce rods of the correct size.

The measuring device is characterized as being a manually operable hand held unit which is free wheeling. This measuring device can be used, for example, to measure one of every hundred or so filter rods being made on an automatic rod making machine.

What is claimed is:

1. A device for measuring the circumference of a cylindrical rod having a predetermined normal diameter comprising
    first means for rolling a rod through a known number of revolutions on a measured surface without slippage, including
    a pair of concentric cylinders with a selected one of said cylinders having disposed thereon a measured surface, said concentric cylinders defining an annular gap for rolling said rod therebetween;
    second means for placing an index mark on the rod at an initial point of said measured surface; and
    third means for indicating the position of the index mark on said measured surface after rolling of the rod on said measured surface.

2. A device as set forth in claim 1 wherein said second means is a marking means mounted on the outer one of said cylinders.

3. A device as set forth in claim 1 wherein the outer one of said cylinders has an aperture and said third means is a transparent window having a graduated scale disposed over said aperture.

4. A device for measuring the circumference of a cylindrical rod having a predetermined normal diameter comprising an outer cylinder having a peripheral wall, a longitudinally disposed slot extending across said wall, and an aperture in said wall;

an inner cylinder rotatably mounted concentrically and coaxially within said outer cylinder, said inner cylinder having a peripheral wall spaced from said wall of said outer cylinder to define a gap therebetween for rollably receiving a rod therebetween;

a marking means mounted on said outer cylinder on an opposite side of said slot from said aperture for placing an index mark on a rod located between said cylinders; and a graduated scale disposed over said aperture for indicating a multiple of the circumference of a rod in response to coincidence of the index mark on a rod rolling past said aperture with said scale.

5. A device as set forth in claim 4 wherein said marking means is an ink pen.

6. A device as set forth in claim 4 wherein said cylinders define a gap of 6.5 to 7.5 millimeters.

7. A device as set forth in claim 4 wherein said outer cylinder has a measured inner surface between said marking means and an intermediate point of said scale equal to a known number of revolutions of the rod.

8. A device as set forth in claim 7 wherein said measured surface is of a length of 240 millimeters.

9. A device as set forth in claim 8 wherein said scale is graduated in millimeters starting at a distance of 220 millimeters from said marking means and extending to a distance of 250 millimeters from said marking means and said cylinders are spaced to roll a rod ten times from said marking means to a point within said scale.

10. A device as set forth in claim 4 which further comprises a hand wheel secured to said inner cylinder for manual rotation of said inner cylinder within said outer cylinder.

11. A device as set forth in claim 4 wherein said outer cylinder has an integral end wall at one end and a removably mounted end wall at an opposite end, and said inner cylinder has a pair of trunnions, each said trunnion being rotatably received in a respective one of said end walls.

12. A device as set forth in claim 11 which further comprises a hand wheel releaseably secured to one of said trunnions on said inner cylinder for manual rotation of said inner cylinder within said outer cylinder.

13. A device for measuring the circumference of a filter rod, said device comprising an outer cylinder having a peripheral wall defining a measured circumferential surface for rolling of a rod thereon, an integral end wall at one end, a removable end wall at an opposite end disposed in fixed relation to said peripheral wall, a longitudinally disposed slot in said peripheral wall and an aperture in said peripheral wall;

an inner cylinder having a pair of trunnions, each said trunnion being rotatably mounted in a respective one of said end walls, said inner cylinder being spaced concentrically within said outer cylinder to define a gap therebetween;

an ink marker mounted on said outer cylinder on an opposite side of said slot from said aperture for placing an index mark on a rod located between said cylinders at an initial point of said measured surface;

a graduated scale disposed over said aperture and extending over a terminal point of said measured surface for indicating a multiple of the circumference of the rod; and a hand wheel releasably secured to one of said trunnions on said inner cylinder for manual rotation of said inner cylinder within said outer cylinder.

* * * * *